US006768087B2

(12) United States Patent
Kikuchi

(10) Patent No.: US 6,768,087 B2
(45) Date of Patent: Jul. 27, 2004

(54) SMALL ION-DECOMPOSING MELTING FURNACE

(75) Inventor: Masaichi Kikuchi, 1-16-6, Taira-machi, Meguro-ku, Tokyo 152-0032 (JP)

(73) Assignees: Masaichi Kikuchi, Tokyo (JP); Shigeto Nakashima, Miyazaki (JP); Yukiko Moriwaki, Sorachi-gun (JP)

( * ) Notice: Subject to any disclaimer, the term of this patent is extended or adjusted under 35 U.S.C. 154(b) by 0 days.

(21) Appl. No.: 10/257,954

(22) PCT Filed: Apr. 2, 2001

(86) PCT No.: PCT/JP01/02864

§ 371 (c)(1), (2), (4) Date: Mar. 28, 2003

(87) PCT Pub. No.: WO02/081969

PCT Pub. Date: Oct. 17, 2002

(65) Prior Publication Data

US 2003/0160046 A1 Aug. 28, 2003

(51) Int. Cl.[7] .............................. H05B 6/64; B09B 3/00
(52) U.S. Cl. ........................ 219/680; 219/683; 219/686
(58) Field of Search ................................. 219/678, 679, 219/680, 683, 681, 686, 702, 709, 770; 431/2, 8; 110/190, 345, 346, 341, 349; 422/22

(56) References Cited

U.S. PATENT DOCUMENTS 4,052,139 A * 10/1977 Paillaud et al. ................ 431/2
5,123,362 A * 6/1992 Kikuchi ...................... 110/341
6,344,638 B1 * 2/2002 Tomasello .................. 219/770

FOREIGN PATENT DOCUMENTS

| | | | | |
|---|---|---|---|---|
| JP | 55-68575 | | 5/1980 | |
| JP | 8-75128 | | 3/1996 | |
| JP | 9-269106 | | 10/1997 | |
| JP | 9-269109 | | 10/1997 | |
| JP | 11-90216 | | 4/1999 | |
| JP | 2003266043 A | * | 9/2003 | ........... B09B/03/00 |

* cited by examiner

*Primary Examiner*—Tu Ba Hoang
(74) *Attorney, Agent, or Firm*—Oblon, Spivak, McClelland, Maier & Neustadt, P.C.

(57) ABSTRACT

A magnetron for supplying a microwave and an ion burner are provided in an incinerator main body, and the microwave from the magnetron and ion flame from the ion burner are caused to resonate to create a high temperature state in the incinerator main body, whereby waste in the incinerator main body is decomposed and melted by positive (+) and negative (−) activated ions. A tokamak is also provided on the outer side of the incinerator main body so that charged particles (radiation) and electromagnetic wave in the incinerator main body may be reflected and gathered at the center of the incinerator main body to increase an ion concentration to thereby increase a plasma concentration, thereby achieving an improvement in terms of decomposition efficiency. Both or one of quartz and an acceptor level additive is mixed with a furnace wall of the incinerator main body.

14 Claims, 9 Drawing Sheets

SMALL ION-DECOMPOSING MELTING FURNACE

TECHNICAL FIELD

The present invention relates to a small ion decomposition type melting furnace capable of incinerating and melting wastes such as metals as well as trashes such as garbage, plastics, liquid wastes, and waste oils.

BACKGROUND ART

Incinerators for processing objects to be incinerated such as trash and burned ash by melting them at a high temperature of 1000° C. or more are of various types, including the surface type, spiral flow type, coke bed type, arc type, plasma type, electrical resistance type, and induction heating type. In all of them, the melting temperature is approximately 1000° C. to 1500° C.

An incinerator capable of burning at higher temperatures is disclosed in JP 3,034,461B previously developed and filed by the present inventor. In the incinerator disclosed, after the operation start of an ion flame generator (ion burner) provided in the incinerator main body, kerosene is burned at temperatures of up to approximately 1800° C. to generate a cation flame; then, when a temperature in excess of 1800° C. is attained, oil containing metal powder is burned to generate a cation flame; then, when a temperature in excess of 2500° C. is attained, water is also burned to generate a powerful cation flame at a temperature exceeding 4000° C. This cation flame is injected into the incinerator to be trapped therein in a donut-like fashion, and the temperature in the incinerator is maintained at approximately 4000° C. to 4500° C. When, in this condition, an object to be incinerated is thrown into the waste throw-in hopper, while the object to be incinerated falls down to the incinerator main body, the object is exposed to the cation flame and microwave inside the incinerator main body and the heat thereof to be decomposed and melted in a short time before it is accumulated in a melt reservoir as a high temperature melt.

The above incinerator is advantageous in that the object to be incinerated is quickly processed, thus providing high processing capacity. While it has no particular drawbacks to be mentioned, the incinerator is not without its problems. It is rather large in size and hard to move and difficult to handle.

Apart from the above, an incinerator using a magnetron is available. In this case, when, for example, 20 kg of waste is thrown in, and a microwave of 2450 MHz (output: 2.5 KW) generated from the magnetron is applied thereto, the upper limit of temperature attained in 40 to 60 minutes is 800° C. to 1100° C., so that it is impossible to melt metal (iron).

It is an object of the present invention to provide a small ion decomposition type melting furnace which is, though small, of high decomposing/melting capacity and capable of melting and incinerating metal as well as garbage and which can be moved and is easy to handle.

DISCLOSURE OF THE INVENTION

According to the present invention, there is provided a small ion decomposition type melting furnace, in which an incinerator main body 1 for incinerating an object of processing including at least trash is provided with a magnetron 2 for generating a microwave and an ion flame generator 3 for injecting an ion flame into the incinerator main body 1, and in which the microwave from the magnetron 2 and ion gas (ion flame) from the ion flame generator 3 are caused to resonate to create a high temperature state in the incinerator main body 1, wastes in the incinerator main body 1 being decomposed and melted by positive (+) and negative (−) activated ions. Further, a tokamak 4 is provided outside the incinerator main body 1, and charged particles (radiation) and an electromagnetic wave in the incinerator main body 1 are reflected by the tokamak 4 and gathered at the center of the incinerator main body 1 to increase an ion concentration to increase a plasma concentration, increasing decomposition efficiency. Furthermore, a throw-in inlet 5 at a top portion of the incinerator main body 1 can be opened and closed with a lid 6, which can be opened and closed by an electric opening/closing machine 7. In both the cases, the temperature in the incinerator main body 1 is maintained at 1800° C. to 2000° C.

According to the present invention, there is provided a small ion decomposition type melting furnace, comprising the small ion decomposition type melting furnace 8 combined with a cooling vessel 9 and an exhaust gas processing vessel 10, in which an incinerator main body 1 of the small ion decomposition type melting furnace 8, the cooling vessel 9, and the exhaust gas processing vessel 10 are successively connected in that order, and in which slag from the incinerator main body 1 is cooled by the cooling vessel 9 and an exhaust gas generated at this time flows into the exhaust gas processing vessel 10, where toxic substances in the exhaust gas are absorbed and removed by an exhaust gas absorbing material 11 in the exhaust gas processing vessel 10. Further, the incinerator main body 1 and the exhaust gas processing vessel 10 are contained in a single case 14, and the exhaust gas processing vessel 10 is equipped with an external air introducing blower 12 and an exhaust fan 13. Furthermore, both or one of quartz and an acceptor level additive is mixed with a furnace wall 20 of the incinerator main body 1.

BEST MODE FOR CARRYING OUT THE INVENTION (First Embodiment)

Figure 3:
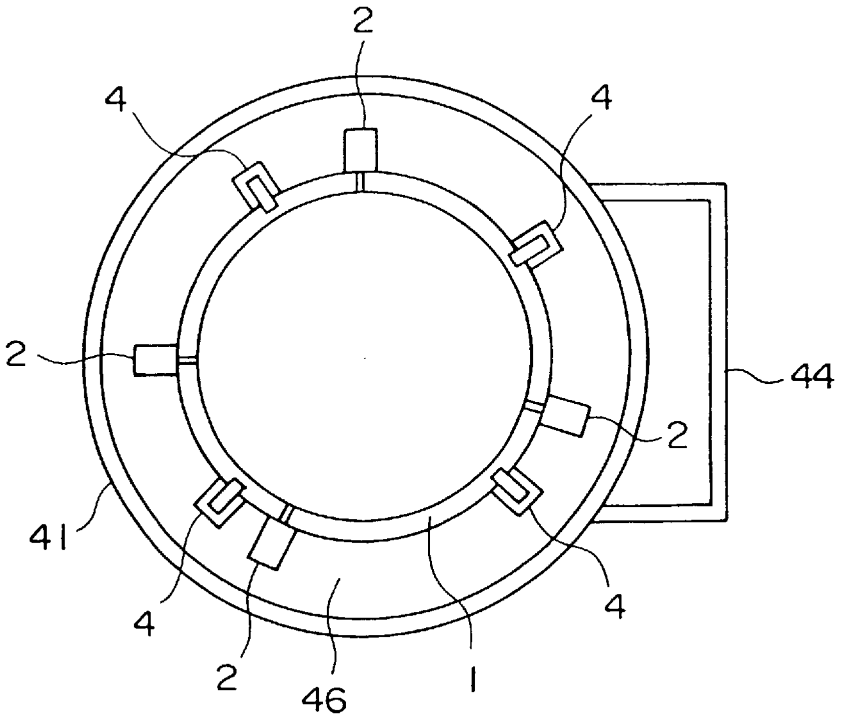
FIG. 3 is a cross-sectional view of the small ion decomposition type melting furnace of FIG. 1.
Figure 4:
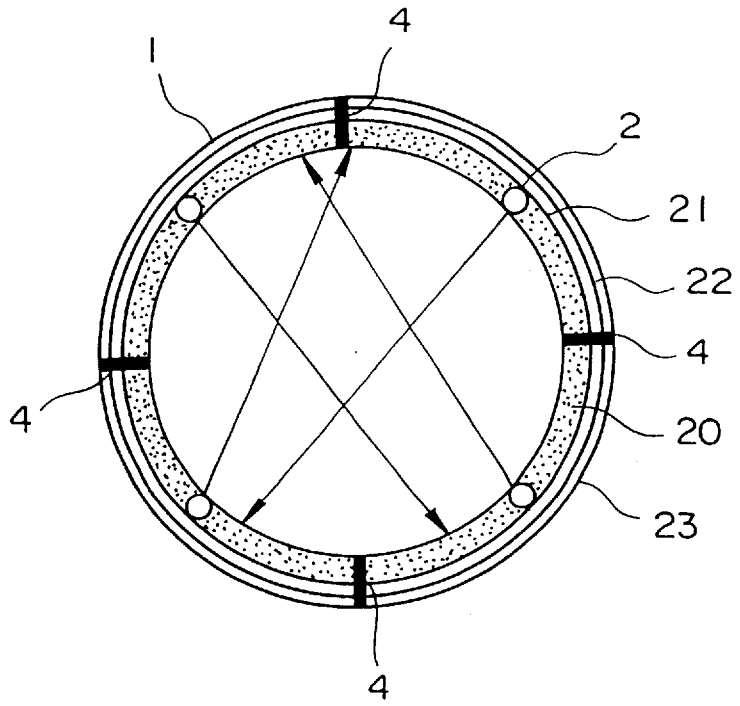
FIG. 4 is a cross-sectional view of an incinerator main body in the small ion decomposition type melting furnace of FIG. 1.
Figure 5:
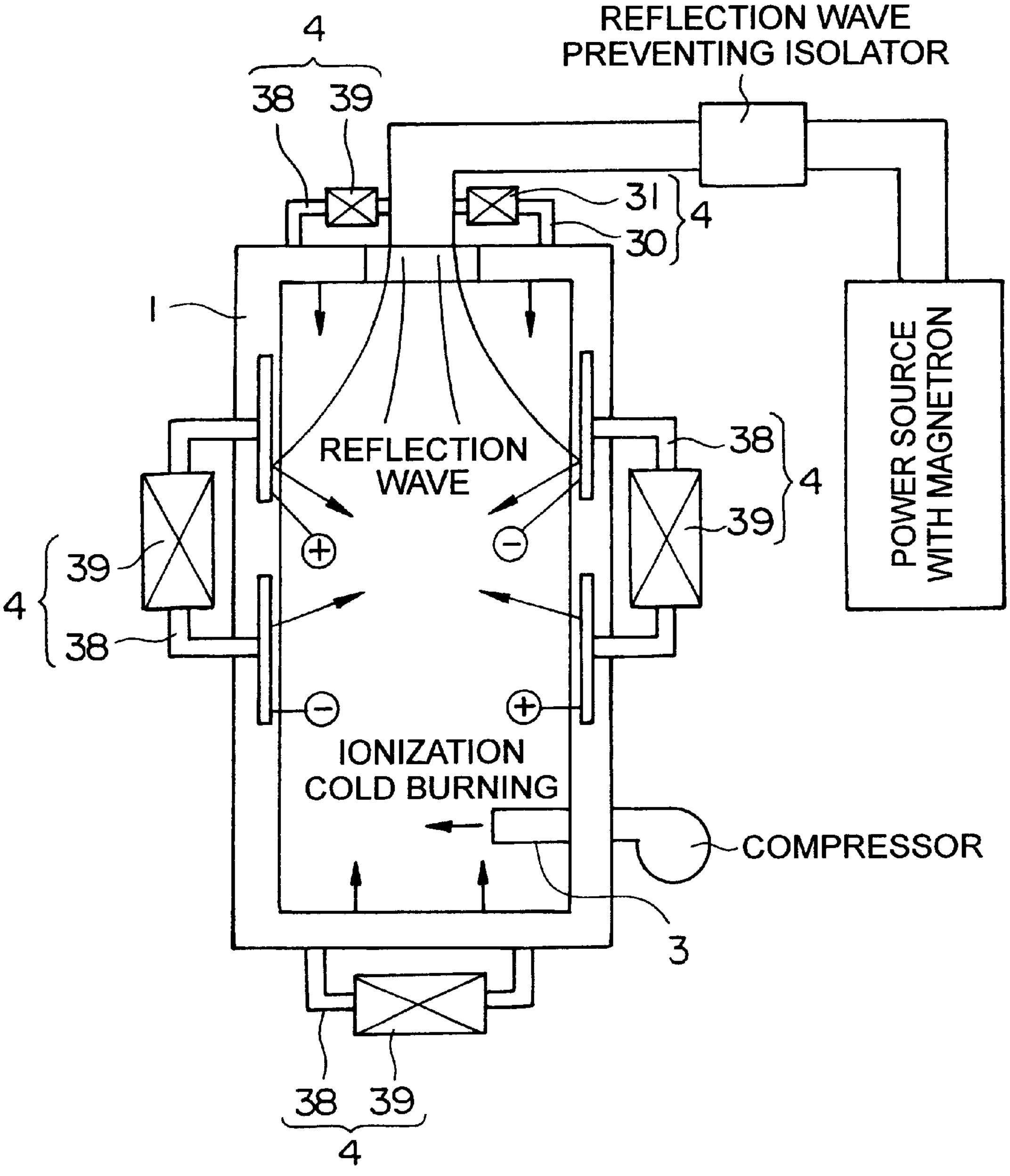
FIG. 5 is an explanatory diagram showing a tokamak in the small ion decomposition type melting furnace of FIG. 1.

A small ion decomposition type melting furnace according to a first embodiment of the present invention will now be described with reference to FIGS. 1 through 8. In these drawings, a small ion decomposition type melting furnace 8 includes an incinerator main body 1 with a peripheral wall provided with four magnetrons 2. Mounted to a lid 6 placed on a throw-in inlet 5 in the upper portion of the incinerator main body 1 is an ion flame generator (ion burner) 3 directed downwards (i.e., with the flame outlet directed toward the interior of the incinerator main body 1), and six tokamaks 4 are provided on the incinerator main body 1. As shown in FIG. 3, the four magnetrons 2 are mounted at positions of the peripheral wall of the incinerator main body 1 which are not opposed to each other, and, of the six tokamaks 4, four tokamaks are provided in the outer periphery of the incinerator main body 1 as shown in FIG. 3, and two tokamaks are respectively provided in the upper and lower portions of the incinerator main body 1 as shown in FIG. 5.

Figure 6A:
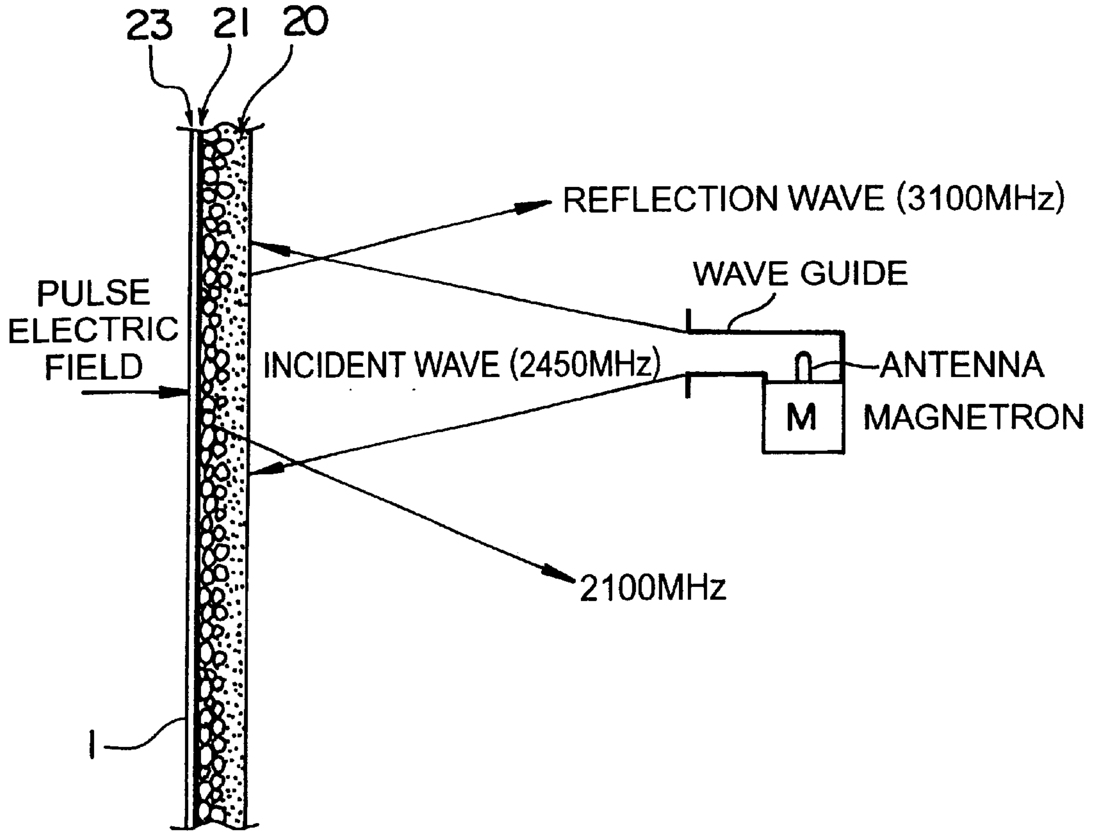
FIG. 6A is a diagram illustrating the Raman effect of the incinerator main body of the small ion decomposition type melting furnace of the present invention.
Figure 6B:
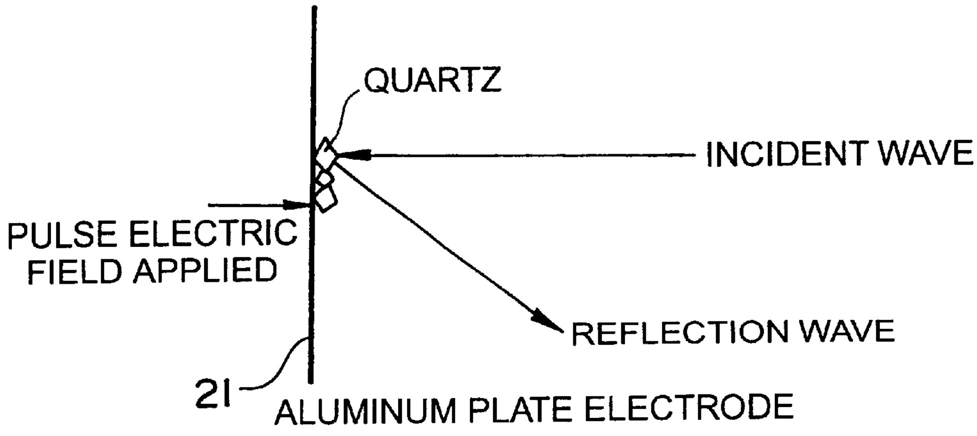
FIG. 6B is a diagram illustrating the piezoelectric effect of the incinerator main body.

The furnace wall 20 of the incinerator main body 1 is formed of a refractory material, for example, a castable refractory obtained by mixing a refractory aggregate with a hydraulic material, such as alumina cement or phosphoric acid, quartz, acceptor level additive, etc. As shown in FIGS. 2 and 4, it is formed as a cylinder. As shown in FIGS. 4 and 6A, its outer side is covered with a reflection material 21 consisting of aluminum, stainless steel or the like, and the outer side thereof is covered with an insulator 22, the outer side of which is covered with a casing 23 formed of an iron plate or some other metal material. The term acceptor level refers to the high speed electron transition when forming an oxide semiconductor, the entire substance being negatively charged. When quartz and an acceptor level additive are added to the furnace wall 20 of the incinerator main body 1, it is possible to obtain the piezoelectric effect of the quartz (oscillation resulting from application of electric impact to quartz crystal: FIG. 6B) and the Raman effect due to the secondary electron emission of the acceptor level additive (reflection of a wave of a frequency different from that of an incident wave upon striking thereof: FIG. 6A).

Figure 8:
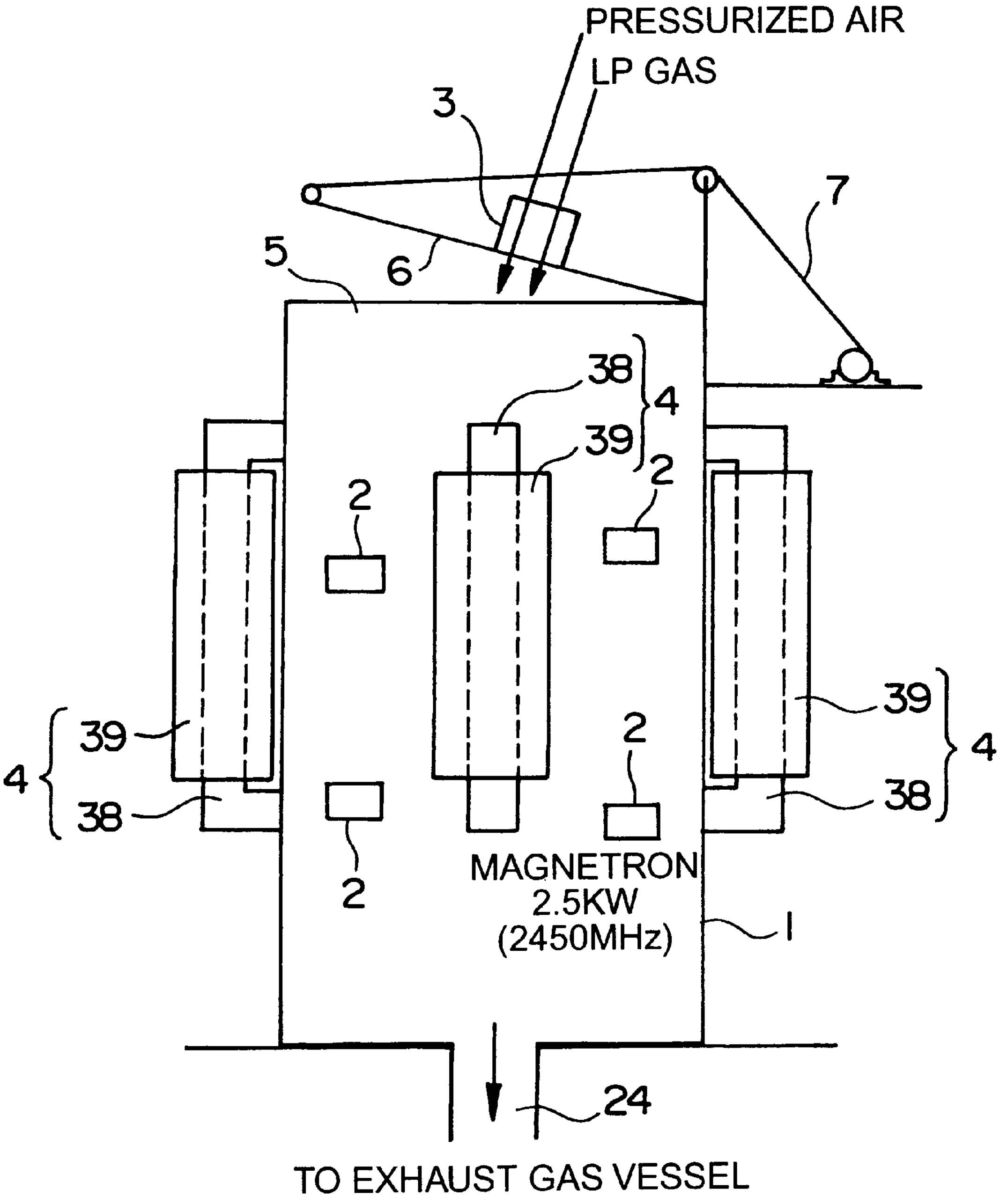
FIG. 8 is an explanatory diagram showing the small ion decomposition type melting furnace of the present invention.

The incinerator main body 1 may be mainly formed of alumina and quartz, with an acceptor level additive being added thereto. The size of the incinerator main body 1 can be arbitrarily selected; when it is formed, for example, as a cylinder having a diameter of 1.2 mϕ and a height of approximately 1.5 m, the movement and handling of the incinerator are facilitated. As shown in FIG. 2, the incinerator main body 1 has at its bottom a slag discharge outlet 24; in its upper portion, it has the throw-in inlet 5, on which the lid 6 is placed. As shown in FIG. 8, the lid 6 is automatically opened and closed by operating a hoist, for example, an electric opened and closed by operating a hoist, for example, an electric opening/closing machine 7 consisting of a winch or the like. The ion burner 3 is mounted to the lid 6 so as to be directed downwards (i.e., with its flame injection nozzle directed toward the incinerator main body 1).

Figure 7A:
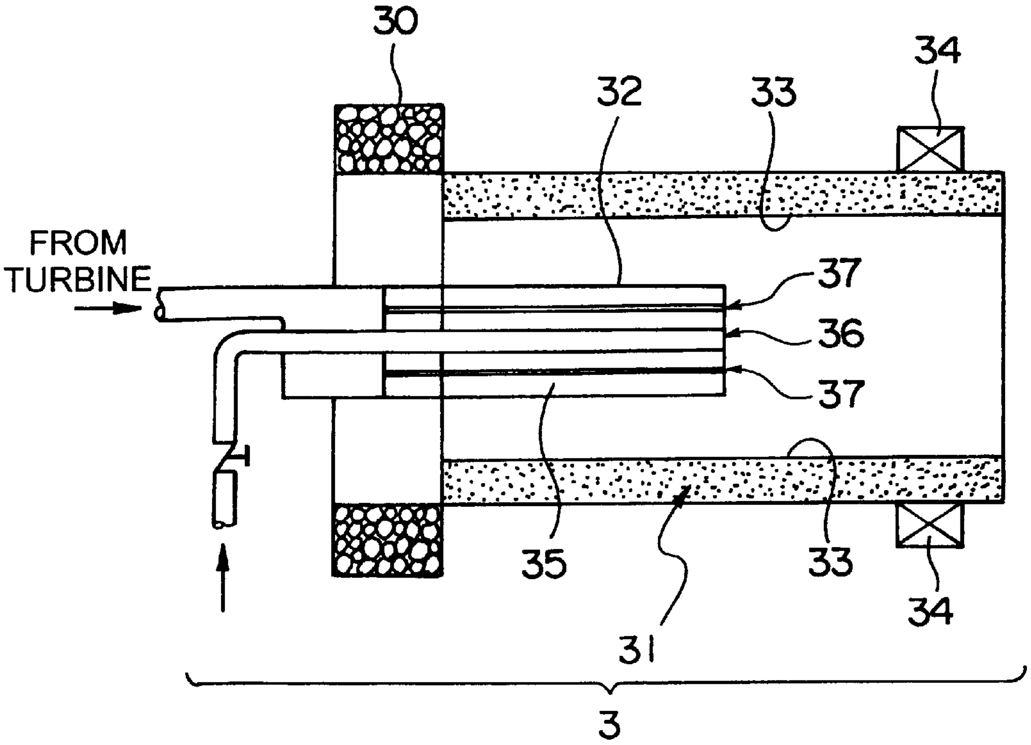
FIG. 7A is a longitudinal sectional view of an ion burner in the small ion decomposition type melting furnace of the present invention.
Figure 7B:
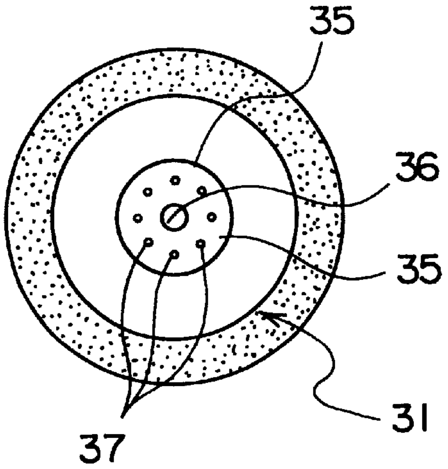
FIG. 7B is a front view of the same.

The ion burner 3 uses as the fuel a propane gas of, for example, approximately 30 kcal. As shown in FIGS. 7A and 7B, the ion burner 3 has a cylindrical pulse magnetic field generating portion 30, a casing 31 protruding therefrom and formed as a thin and narrow cylinder with a smaller diameter, and a fuel atomizer 32 arranged at the center of the interior of the casing 31. The casing 31 is formed of a ferromagnetic metal (such as iron, nickel, or cobalt), and a flame contact ionizing material 33 is provided on the inner peripheral surface thereof.

The flame contact ionizing material 33 is produced through crystallization in an oxidation atmosphere of a composition obtained by combining a photoactive substance with a magnetic material. Examples of the photoactive substance include elements, such as selenium, cadmium, titanium, lithium, barium, and thallium and compounds thereof, such as oxides, sulfides, and halides. The magnetic material consists of a ferromagnetic (such as iron, nickel, cobalt, or a compound thereof), a paramagnetic substance (such as manganese, aluminum, tin, or a compound thereof), or a diamagnetic substance (such as bismuth, phosphor, copper, calcium, or a compound thereof).

Mounted to the outer periphery of the casing 31 is an electromagnetic coil 34 with an iron core. In the electromagnetic coil 34, a copper wire coil is mounted to the iron core, with the copper wire coil being connected to a power source device. When a pulse current is applied from the power source device, a powerful high frequency magnetic field is generated on the inner side of the coil, strongly magnetizing the casing 31 made of a ferromagnetic metal. The high frequency magnetic field has a magnetic flux density of, for example, 10000 or more and a frequency of approximately 20 to 50 MHz. On the inner side of the casing 31 magnetized by the electromagnetic coil 34, there is generated a high frequency magnetic field, which activates the flame contact ionizing material 33. A hydrocarbon flame coming into contact with the flame contact ionizing material 33 is turned into an ion flame having a large number of cations (carbon ions, hydrogen ions, iron ions, etc.) and anions (oxygen ions).

In the fuel atomizer 32 (FIGS. 7A and 7B), there is formed at the center of a nozzle 35 formed of a non-magnetic metal (brass, stainless steel or the like) a fuel ejection hole 36 (with an inner diameter of 3 m) through which fuel (LP gas) is ejected, and, in the outer periphery thereof, there are formed eight air jet holes 37 (with an inner diameter of 1 to 2 mϕ) through which high pressure air is jetted. In this fuel atomizer 32, the fuel ejected from the fuel ejection hole 36 is efficiently atomized by high pressure air ejected from the air jet holes 37 supplied from a turbine on the back side. The amount, pressure, speed, etc. of the air supplied from the turbine can be arbitrarily adjusted by a control device (not shown). The nozzle 35 is fixed to the casing 31 by a support member (not shown).

The magnetrons 2 generate microwaves. The frequency and power of the microwaves generated can be arbitrarily selected; for example, a frequency and a power of approximately 2450 MHz and 2.5 kw, respectively, are suited.

The tokamaks 4 mean electromagnetic mirrors. They are adapted to reflect the −ions and +ions of charged particles and to change the direction of an electromagnetic wave. As shown in FIGS. 2 and 5, coils (tokamak coils) 39 are wound around donut-shaped magnetic cores 38 to prepare electromagnets, and pulse current is supplied to the coils 39. The tokamaks 4 protect the periphery of the incinerator main body 1, reflect the charged particles (radiation) in the incinerator main body 1, and change the direction of an electromagnetic wave. In FIG. 5, four tokamaks 4 are mounted to the periphery of the incinerator main body 1, one to the bottom and one to the top (lid 6), so that the charged particles (radiation) and electromagnetic wave in the incinerator main body 1 are gathered at the center of the incinerator main body 1 which is at high temperature to increase the ion concentration to increase the plasma concentration to thereby achieve an improvement in the efficiency in the decomposition of the object to be incinerated in the incinerator main body 1. Further, in spite of the reduction in size, the heat retention efficiency is high, so that it is possible to efficiently decompose and melt the waste. The pulse current flowing through the coils 39 of the tokamaks 4 is turned into energy for inducing the piezoelectric effect of the quartz used in the furnace wall of the incinerator main body 1.

Figure 1:
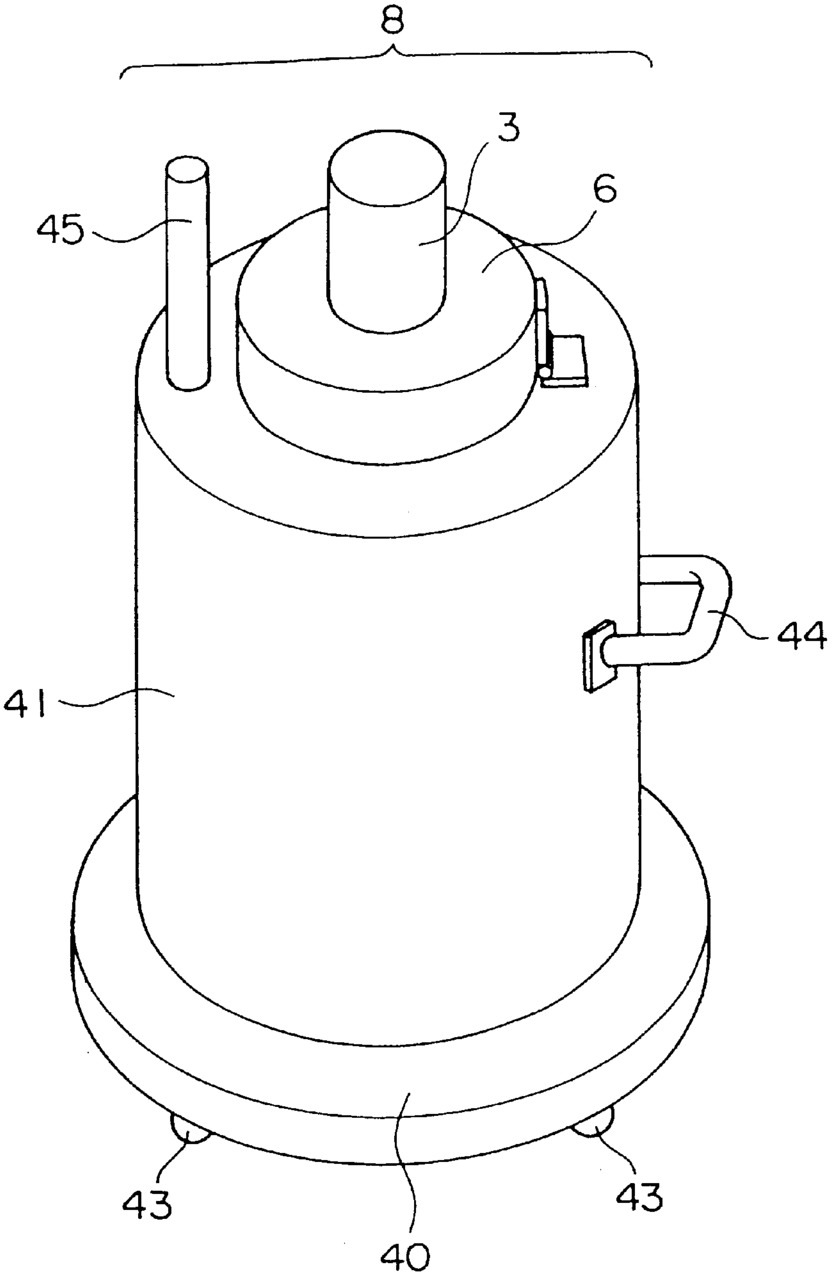
FIG. 1 is a perspective view of an example of the small ion decomposition type melting furnace of the present invention.
Figure 2:
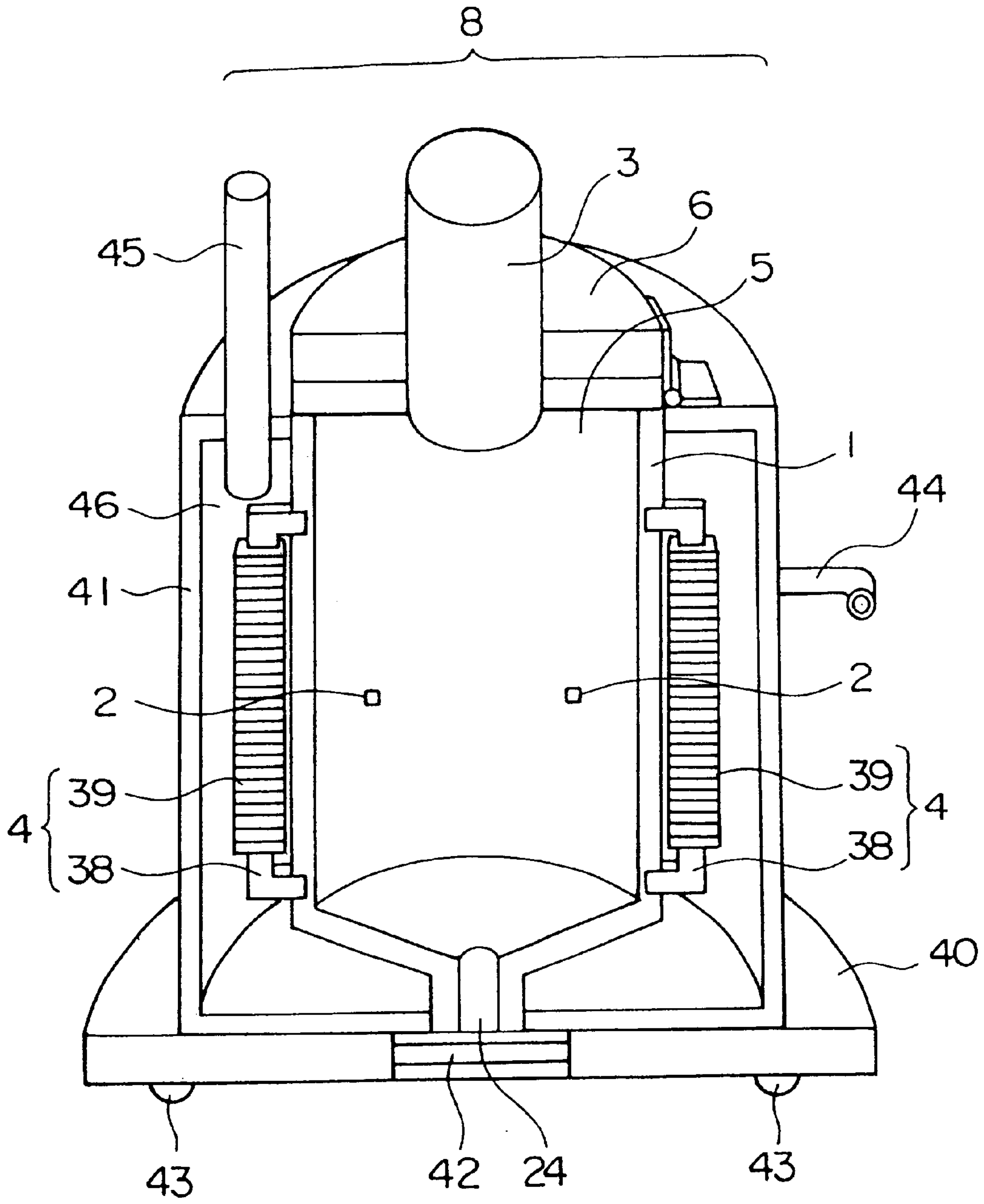
FIG. 2 is a longitudinal sectional view of the small ion decomposition type melting furnace of FIG. 1.

As shown in FIGS. 1 and 2, the incinerator main body 1, the magnetrons 2, and the tokamaks 4 are covered with a cylindrical magnetism-proof cover 41 installed on a disc-like base plate 40. Provided in the base plate 40 is an opening/closing lid 42 for opening and closing the slag discharge outlet 24 of the incinerator main body 1. Movement casters 43 are mounted to the bottom surface of the base plate 40, and a handle 44 is mounted to the outer side of the magnetism-proof cover 41. An exhaust cylinder 45 in the form of a thin and narrow pipe is led out upwardly from the interior of the magnetism-proof cover 41. Due to the exhaust cylinder 45, the air in the space 46 between the magnetism-proof cover 41 and the incinerator main body 1, that is, the high temperature air heated by the radiant heat from the incinerator main body 1 is discharged to the exterior.

(Embodiment 2)

Figure 9:
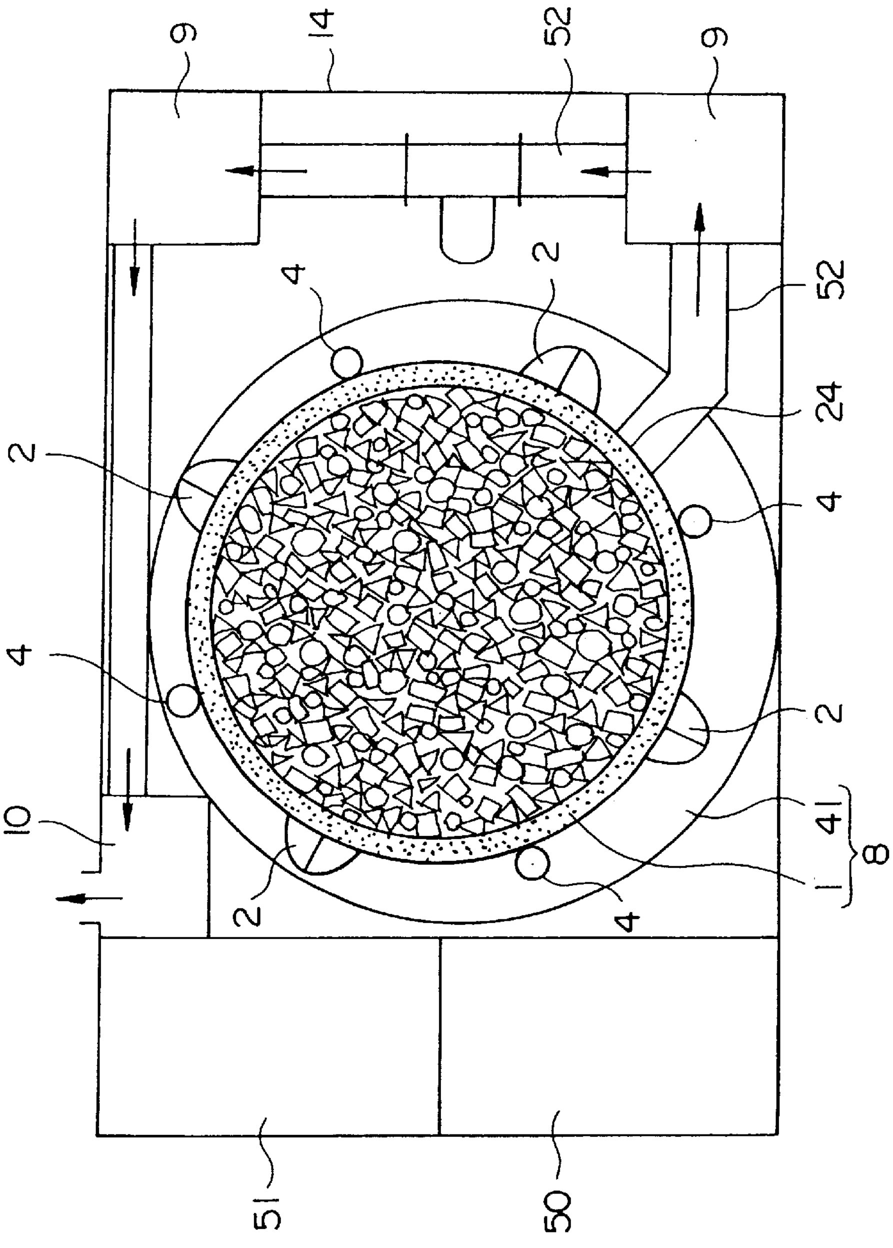
FIG. 9 is an explanatory plan view showing another example of the small ion decomposition type melting furnace of the present invention.
Figure 10:
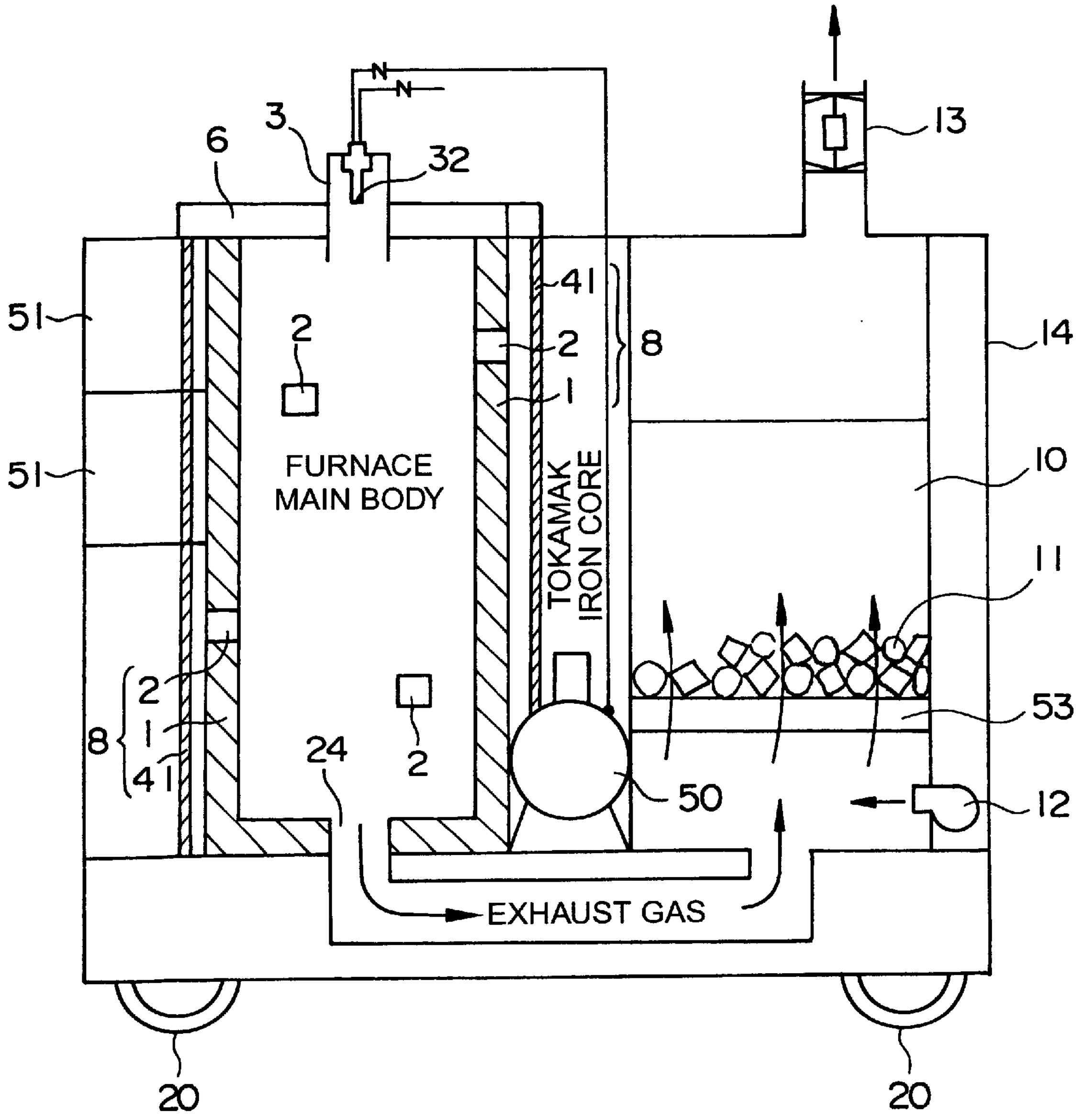
FIG. 10 is a side explanatory view showing the other example of the small ion decomposition type melting furnace of the present invention.

A small ion decomposition type melting furnace according to a second embodiment of the present invention will be described with reference to FIGS. 9 and 10. In this embodiment, the small ion decomposition type melting furnace 8 of Embodiment 1 is combined with a cooling vessel 9 and an exhaust gas processing vessel 10 and contained in a single case 14. In FIGS. 9 and 10, the case 14 also contains an air compressor (compressor) 50 and a power source 51 for the magnetrons along with the cooling vessels 9. The interiors of the small ion decomposition type melting furnace 8, the cooling vessels 9, and the exhaust gas processing vessel 10 communicate with each other through a communication passage (pipe) 52 the inner side of which is coated with a refractory material, so that the exhaust gas from the incinerator main body 1 of the small ion decomposition type melting furnace 8 passes through the cooling vessels 9 to be introduced into the exhaust gas processing vessel 10. Below the exhaust gas processing vessel 10, there is mounted an external air introducing blower 12, and an exhaust fan 13 is mounted to the ceiling of the exhaust gas processing vessel 10. The external air introducing blower 12 serves to cool the exhaust air sent to the exhaust gas processing vessel 10 from the incinerator main body 1 and to send out (force out) the exhaust air in the exhaust gas processing vessel 10 to the exterior. Due to this forcing out, the air in the exhaust gas processing vessel 10 is enabled to communicate easily, and the exhaust gas from the incinerator main body 1 is easily discharged to the exterior through the cooling vessels 9 and the exhaust gas processing vessel 10. In this case, an exhaust gas absorbing material 11 consisting of charcoal, formed zeolite or the like is arranged on a pan 53 of a porous material installed near the bottom of the exhaust gas processing vessel 10, and the toxic substances in the exhaust gas, such as chlorine, carbon, and particles, are absorbed by the exhaust gas absorbing material 11 and are not discharged to the exterior.

The compressor 50 in the case 14 serves to send compressed air to the air ejection holes 37 shown in FIGS. 7A and 7B. The compressor 50 may be of an arbitrary power; for example, it may be approximately 1.5 kw. It is also possible for the compressor 50 to be installed outside the case 14.

(Example of Use)

Next, an example of use of the small ion decomposition type melting furnace of the present invention when burning 20 kg of waste will be described.

(1) The lid 6 of the incinerator main body 1 is opened by the electric opening/closing machine 7 to open the throw-in inlet 5, and 20 kg of waste is thrown into the incinerator main body 1 through the throw-in inlet 5, and then the lid 6 is closed to close the throw-in inlet 5 tightly.

(2) Next, the magnetrons 2 are started, and microwaves generated therefrom are applied to the waste. At this time, the ion burner 3 using propane gas as the fuel is ignited to generate an ion flame. The power and frequency of the microwaves generated from the magnetrons 2 are, for example, approximately 2.5 kw and 2450 MHz, respectively.

(3) The microwaves generated from the magnetrons 2 and the ion gas generated from the ion burner 3 resonate to attack (strike: ionize) the waste, heating the substance from within and depriving it of electrons while proceeding with the decomposition to raise the temperature inside the incinerator main body 1. The waste in the incinerator main body 1 is decomposed and melted into ashes by activated positive (+) and negative (−) ions, and the slag in the form of ashes is melted. At this time, the charged particles (radiation) and electromagnetic waves in the incinerator main body 1 are reflected by the tokamaks 4 provided in the incinerator main body 1 and gathered at the center of the interior of the incinerator main body 1 to increase the ion concentration to increase the plasma concentration, thereby improving the decomposition efficiency. In the case of ordinary waste, it is melted to liquefy at 1500° C. This liquid is guided to the cooling vessel 9 (FIG. 9) outside the incinerator main body 1 through a connection passage (pipe) the inner side of which is coated with a refractory material, and the cooling vessel 9 is cooled with water to turn the liquefied waste into slag. During this process, exhaust gas is generated.

(4) The exhaust gas is guided to the exhaust gas processing vessel 10, and the exhaust gas absorbing material 11 therein absorbs toxic substances, such as chlorine (toxic substance) and carbon, before the exhaust gas is discharged into the atmosphere by the exhaust fan 13 shown in FIG. 10. The exhaust air discharged contains substantially no toxic substances; if contained, the substances are in the form of elements and are harmless.

In the above example of use, the waste turned red and white without generating any smoke in several seconds after the application of microwaves, and was decomposed and melted within 15 to 20 minutes. Inorganic substances were liquefied and discharged to the exterior of the incinerator main body 1 (outside the furnace). This is due to the applied microwaves impinging upon the incinerator main body 1 made of a refractory material and being reflected after being amplified to a frequency higher than the incident frequency because of the piezoelectric effect and the Raman effect of the furnace wall of the main body 1. That is, due to amplification to double the incident frequency or more, which can be proved by the reduction in melting time. Further, due to the ion burner 3, the temperature is raised to 1600° C. to 2000° C., so that metals are also melted to be liquefied; when cooled, the liquefied metals are turned into slag.

INDUSTRIAL APPLICABILITY

The ion decomposition type melting furnace of the present invention provides the following advantages:

(1) Since it utilizes dielectric heating decomposition (ion decomposition) using the microwave, the decomposition speed is high, and no waste of fuel is involved, which is advantageous from the economical point of view.

(2) Since decomposition and melting are effected during the process in which activated ions deprive the object to be incinerated of electrons, no smoke is generated.

(3) Both or one of quartz and an acceptor level additive is mixed with the incinerator main body. When quartz is mixed, Raman spectrum effect is obtained due to the piezoelectric effect of the quartz upon application of microwaves to the incinerator main body, whereby an improvement is achieved in terms of the efficiency in melting and decomposition, making it possible to melt wastes such as metals as well as garbage or the like. When an acceptor level additive is mixed, the Raman effect can be obtained due to the secondary electron emission thereof, thereby achieving an improvement in the efficiency in melting and decomposition.

(4) Since tokamaks are provided in the incinerator main body, the charged particles (radiation) and electromagnetic waves in the incinerator main body are reflected by the tokamaks and gathered at the center of the incinerator main body, whereby the ion concentration is increased to increase the plasma concentration to thereby also improve the decomposition efficiency.

(5) Since the thrown-in inlet in the top portion of the incinerator main body can be opened and closed with a lid, and the lid can be opened and closed by an electric opening/closing machine, the opening/closing operation is facilitated.

(6) Since the temperature in the incinerator main body is maintained at 1800° C. to 2000° C., almost any type of waste can be melted and decomposed any time.

(7) Since it is small, it can be moved.

(8) Due to its small size and simple construction, the handling operation is easy, and any person can operate it.

(9) Exhaust gas, which would cause environmental pollution if discharged into the atmosphere at high temperature, is discharged into the atmosphere after being cooled by the cooling vessel, so that no environmental pollution is involved.

What is claimed is:

1. A small ion decomposition type melting furnace comprising:

an incinerator main body for incinerating an object of processing including at least trash, provided with a magnetron for generating a microwave and an ion flame generator for injecting an ion flame into the incinerator main body, and wherein the microwave from the magnetron and the ion flame from the ion flame generator are caused to resonate to create a high temperature state in the incinerator main body, wastes in the incinerator main body being decomposed and melted by positive (+) and negative (−) activated ions.

2. A small ion decomposition type melting furnace, comprising:

an incinerator main body for incinerating an object of processing including at least trash, provided with a magnetron for generating a microwave;

an ion flame generator for injecting an ion flame into the incinerator main body; and a tokamak provided outside the incinerator main body, wherein the microwave from the magnetron and the ion flame from the ion flame generator are caused to resonate to create a high temperature state in the incinerator main body, wastes in the incinerator main body being decomposed and melted by positive (+) and negative (−) activated ions, and charged particles and an electromagnetic wave in the incinerator main body are reflected by the tokamak and gathered at a center of the incinerator main body to increase an ion concentration to increase a plasma concentration, effecting melting with higher efficiency in said decomposition.

3. A small ion decomposition type melting furnace according to claim 1, wherein a throw-in inlet at a top portion of the incinerator main body can be opened and closed with a lid, which is opened and closed by an electric opening/closing machine.

4. A small ion decomposition type melting furnace according to claim 1, wherein the temperature in the incinerator main body is maintained at 1800° C. to 2000° C.

5. A small ion decomposition type melting furnace comprising:

a small ion decomposition type melting furnace according to claim 1;

a cooling vessel; and an exhaust gas processing vessel, wherein an incinerator main body of the small ion decomposition type melting furnace, the cooling vessel, and the exhaust gas processing vessel are successively connected in that order, and slag from the incinerator main body is cooled by the cooling vessel and an exhaust gas generated at a time of cooling flows into the exhaust gas processing vessel, wherein toxic substances in the exhaust gas are absorbed and removed by an exhaust gas absorbing material in the exhaust gas processing vessel.

6. A small ion decomposition type melting furnace according to claim 5, wherein the exhaust gas processing vessel is equipped with an external air introducing blower and an exhaust fan.

7. A small ion decomposition type melting furnace according to claim 5, wherein the small ion decomposition type melting furnace and the exhaust gas processing vessel are contained in a single case.

8. A small ion decomposition type melting furnace according to claim 1, wherein at least one of quartz and an acceptor level additive is mixed with a furnace wall of the incinerator main body.

9. A small ion decomposition type melting furnace according to claim 2, where a throw-in inlet at a top portion of the incinerator main body can be opened and closed with a lid, which is opened and closed by an electric opening/closing machine.

10. A small decomposition type melting furnace according to claim 2, wherein the temperature in the incinerator main body is maintained at 1800° C. to 2000° C.

11. A small ion decomposition type melting furnace comprising:

a small ion decomposition type melting furnace according to claim 2;

a cooling vessel; and an exhaust gas processing vessel, wherein an incinerator main body of the small ion decomposition type melting furnace, the cooling vessel, and the exhaust gas processing vessel are successively connected in that order, and slag from the incinerator main body is cooled by the cooling vessel and an exhaust gas generated at a time of cooling flows into the exhaust gas processing vessel, wherein toxic substances in the exhaust gas are absorbed and removed by exhaust gas absorbing material in the exhaust gas processing vessel.

12. A small ion decomposition type melting furnace according to claim 11, wherein the exhaust gas processing vessel is equipped with an external air introducing blower and an exhaust fan.

13. A small ion decomposition type melting furnace according to claim 11, wherein the small ion decomposition type melting furnace and the exhaust gas processing vessel are contained in a single case.

14. A small ion decomposition type melting furnace according to claim 2, wherein at least one of quartz and an acceptor level additive is mixed with a furnace wall of the incinerator main body.

* * * * *